United States Patent
Ma et al.

(10) Patent No.: US 8,149,946 B2
(45) Date of Patent: Apr. 3, 2012

(54) JOINT TRANSCEIVER DESIGN FOR MIMO COMMUNICATIONS

(75) Inventors: Hsin-Pin Ma, Hsinchu (TW); Chien-Jen Huang, Chiayi (TW); Jen-Yuan Hsu, Jincheng Township (TW); Pang-An Ting, Fongyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 540 days.

(21) Appl. No.: 12/354,385

(22) Filed: Jan. 15, 2009

(65) Prior Publication Data
US 2009/0279630 A1 Nov. 12, 2009

Related U.S. Application Data

(60) Provisional application No. 61/050,972, filed on May 6, 2008.

(51) Int. Cl.
*H04B 7/02* (2006.01)

(52) U.S. Cl. ........ 375/267; 375/260; 375/295; 375/299; 375/340; 375/347; 455/101; 455/132; 455/296; 455/500; 455/562.1; 370/334

(58) Field of Classification Search .................. 375/260, 375/267, 295, 299, 340, 347; 455/101, 132, 455/296, 500, 562.1; 370/334
See application file for complete search history.

(56) References Cited

U.S. PATENT DOCUMENTS

| 7,873,113 B2 * | 1/2011 | Takano et al. ............... 375/267 |
| 2008/0227498 A1 | 9/2008 | Kwon et al. |
| 2008/0285667 A1 * | 11/2008 | Mondal et al. ............... 375/260 |
| 2009/0190691 A1 * | 7/2009 | Ariyavisitakul et al. ..... 375/295 |

OTHER PUBLICATIONS

Jiang, Yi et al., "MIMO Transceiver Design Using Geometric Mean Decomposition", ITW2004, San Francisco, Texas, Oct. 24-29, 2004.

* cited by examiner

*Primary Examiner* — Leon Flores
(74) *Attorney, Agent, or Firm* — Finnegan, Henderson, Farabow, Garrett & Dunner, LLP

(57) ABSTRACT

A method and apparatus for transmitting data in a MIMO communication system, the method including encoding at least one data symbol by implementing a first precoding scheme, the first preceding scheme including a precoder derived from a first channel state information (CSI). The method further includes selecting at least one antenna that maximizes the first CSI, the at least one antenna being selected by implementing a first selection scheme, and transmitting the at least one data symbol via the at least one antenna.

11 Claims, 8 Drawing Sheets

JOINT TRANSCEIVER DESIGN FOR MIMO COMMUNICATIONS

RELATED APPLICATIONS

This application claims the benefit of U.S. Provisional Application No. 61/050,972, filed on May 6, 2008, the contents of which are herein incorporated by reference in its entirety.

TECHNICAL FIELD

This invention relates to a multiple-input multiple-output (MIMO) communication system and, more specifically, to antenna selection in a MIMO transceiver.

DISCUSSION OF RELATED ART

Since the inception of modern wireless communication theory, most communication systems have taken a single-input single-output (SISO) approach, where a single antenna is used at both the transmitter and receiver. However, with increasing demand for faster and more reliable communication systems, multiple-input multiple-output (MIMO) systems are an alternative approach. MIMO communication systems have recently received increased attention due to their potential for providing significantly higher data rates in frequency selective and fading wireless channels.

In a MIMO system, multiple antennas can be used at both the transmitter and receiver. The use of multiple antennas can help to improve data rate by using spatial multiplexing, where different data streams are transmitted by each antenna, and/or to enhance diversity of a wireless channel by transmitting copies of a same data stream on different antennas.

While a MIMO system can significantly improve bit error rate (BER) performance while maintaining high data rates, a major concern in the implementation of a MIMO system is the increased system and hardware complexity. Each antenna needs to be attached to a RF chain (modulator, analog-to-digital (A/D) or digital-to-analog (D/A) converter, low noise amplifier, down converter, etc.).

The idea behind antenna selection is to employ a large number of inexpensive antenna elements and to select only a best subset of antenna elements to transmit or receive data. By using only a best subset of the antenna elements, fewer of the more expensive RF chains are necessary.

Research has shown that the diversity obtained by using antenna selection in spatial multiplexing systems can be the same as the diversity achieved when the whole set of antenna elements are used.

SUMMARY

Consistent with some embodiments of the present invention, a method for transmitting data in a MIMO communication system includes encoding at least one data symbol by implementing a first preceding scheme. The first precoding scheme includes a precoder derived from a first channel state information (CSI). At least one antenna that maximizes the first CSI is selected, the at least one antenna is selected by implementing a first selection scheme and the at least one data symbol is transmitted via the at least one antenna.

In another embodiment, a transmitter in a MIMO communication system includes a precoder unit (PU) coupled to receive at least one data symbol, which utilizes a first channel state information (CSI) to encode the at least one data symbol by implementing a first precoding scheme. An antenna selection unit (ASU) is coupled to receive the first CSI and configured to select at least one antenna that maximizes the first CSI. The at least one antenna is selected by implementing a first selection scheme.

Additional features and advantages of the invention will be set forth in part in the description which follows, and in part will be obvious from the description, or may be learned by practice of the invention. The features and advantages of the invention will be realized and attained by the elements and combinations particularly pointed out in the appended claims.

BRIEF DESCRIPTION OF THE DRAWINGS

The accompanying drawings, which are incorporated in and constitute a part of this specification, illustrate embodiments of the invention and, together with the description, serve to explain the principles of the invention.

DETAILED DESCRIPTION

In the following description and claims, the terms "coupled" and "connected," along with their derivatives, may be used. It is to be understood that these terms are not necessarily intended as synonyms for each other. Rather, in particular embodiments, "connected" and/or "coupled" may be used to indicate that two or more elements are in direct physical or electronic contact with each other. However, "coupled" may also mean that two or more elements are not in direct contact with each other, but yet still cooperate, communicate, and/or interact with each other.

Figure 1:
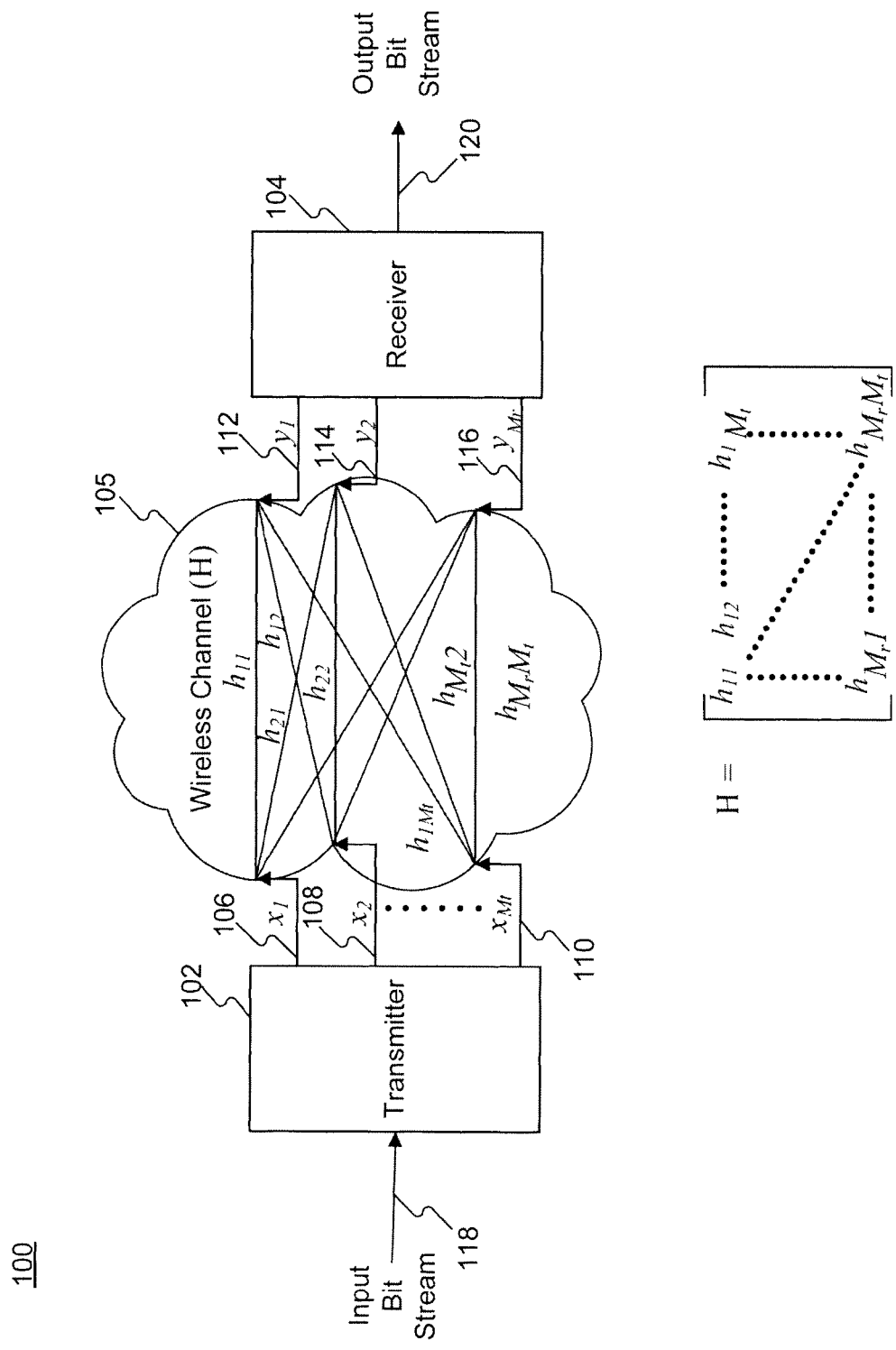
FIG. 1 illustrates a block diagram of an exemplary MIMO transceiver system in accordance with an embodiment of the present invention.

FIG. 1 illustrates an exemplary MIMO transceiver system 100 in accordance with an embodiment of the present invention. System 100 includes a transmitter 102 and a receiver 104. Transmitter 102 may be part of a base station and receiver 104 may be part of an access point. Conversely, transmitter 102 may be part of an access terminal and receiver 104 may be part of a base station. A base station may be a fixed or mobile transceiver that communicates/exchanges data with one or more access points within a certain range. An access point may be a fixed or mobile communication device, such as a mobile telephone, a personal computer, a television receiver, a MP3 player, a personal digital assistant (PDA) or any other video, audio, or data device capable of radio communications.

Transmitter 102 can include transmit antennas 106, 108 and 110, and receiver 104 can include receive antennas 112, 114 and 116. For convenience, system 100 is depicted as including three transmit and receive antennas. However, there may be any number of transmit antennas and any number of receive antennas that can be included in a given transmitter and/or receiver. Therefore, the present disclosure is not limited in the number of antennas that may be included and supported by a MIMO system that is in accordance with the present invention. For convenience, the following description assumes that transmitter 102 can include $M_T$ number of antenna elements from which a subset of $M_t$ number of transmit antennas can be selected (where $M_t \leq M_T$), and receiver 104 can include $M_R$ number of antenna elements from which $M_r$ number of receive antennas can be selected (where $M_r \leq M_R$). A transmit antenna and a receive antenna can be defined as an antenna element that is coupled with a corresponding RF chain.

Data can be transmitted to receiver 104 via a channel 105 (such as a wireless channel). Channel 105 can be represented by a channel matrix H and can comprise communication paths $h_{11}$, $h_{12}$, $h_{1M_t}$, $h_{21}$, $h_{22}$, $h_{m_1}$, $h_{M_rM_t}$, etc. where $h_{AB}$, A $\in \{1, 2, \ldots, M_r\}$ and B $\in \{1, 2, \ldots, M_t\}$, can represent a channel coefficient (of matrix H) of a communication path from transmit antenna B to receive antenna A.

Transmitter 102 can be coupled to receive an input bit stream 118. As will be discussed in detail below, transmitter 102 can include various functional units that can receive bit stream 118, and generate transmit symbols $(x_1, x_2, x_3, \ldots, x_{M_t})$ that can be transmitted via transmit antennas such as exemplary antennas 106, 108 and 110. Similarly, receiver 104 can include various functional units that can process symbols $(y_1, y_2, y_3, \ldots, y_{M_r})$ that can be received from the receive antennas such as exemplary antennas 112, 114 and 116, and generate an output bit stream 120. In a hypothetical ideal transmission, bit stream 118 would be equivalent to bit stream 120.

As will be discussed in detail below, it should be understood that the various functional units included in transmitter 102 and receiver 104, can in practice, individually or in any combinations, be implemented in hardware, in software executed on one or more hardware components (such as one or more processors, one or more application specific integrated circuits (ASIC's) or other such components) or in any combination thereof.

Transmit signal x (where $x = [x_1, x_2, x_3, \ldots, x_{M_t}]^T$ is a column vector with $M_t$ number of elements) can be transmitted over channel 105 to receiver 104. Transmitted signal x may be modified as it passes through channel 105, resulting in a modified signal y (where $y = [y_1, y_2, y_3, \ldots, y_{M_r}]^T$ is a column vector with $M_r$ number of elements). The modified signal y that can be received at receiver 104 can be expressed as:

$$y = Hx + n \quad (1)$$

where H is the channel matrix and n is a complex additive white Gaussian noise vector with independent and identically distributed (i.i.d) entries having a zero mean and a variance of $\sigma_n^2$ per entry. The signal to noise ratio (SNR) can be defined as $\gamma = 1/\sigma_n^2$.

As shown in (1), transmitted signal x can be modified by channel matrix H and noise n. Because H and n can be non-constant, channel state information (CSI) of channel 105 at transmitter 102 can help in minimizing transmission error and can improve capacity of channel 105. CSI of channel 105 can be estimated at receiver 104 and can be communicated to transmitter 102. CSI of channel 105 can include an estimate of channel matrix H.

To further boost capacity and bit error rate (BER) performance of system 100, transmitter 102 may generate transmit symbols $(x_1, x_2, x_3, \ldots, x_{M_t})$ by implementing various precoding schemes such as a minimum mean square error (MMSE)-based precoding scheme, a maximum likelihood (ML)-based precoding scheme, or other such precoding schemes, to encode data symbols that can be generated from input bit stream 118. These various precoding schemes can utilize CSI of channel 105 to improve the robustness of transmit signal x. Precoding schemes that can be implemented by transmitter 102 are discussed in detail in FIG. 2.

In some embodiments, each element of signal $x = [x_1, x_2, x_3, \ldots, x_{M_t}]^T$ can be transmitted to receiver 104 via a different antenna among the $M_t$ number of transmit antennas included in transmitter 102. As shown in FIG. 1, each communication path of channel 105 can include a different channel coefficient. Because channel matrix H can comprise all channel coefficients associated with all communication paths ($h_{AB}$, A $\in \{1, 2, \ldots, M_r\}$ and B $\in \{1, 2, \ldots, M_t\}$), CSI of channel 105 at transmitter 102 can be further used to select the best communication paths (i.e., to select a best set of one or more transmit antennas out of the $M_T$ total number of antenna elements that can be included in transmitter 102.

Figure 2:
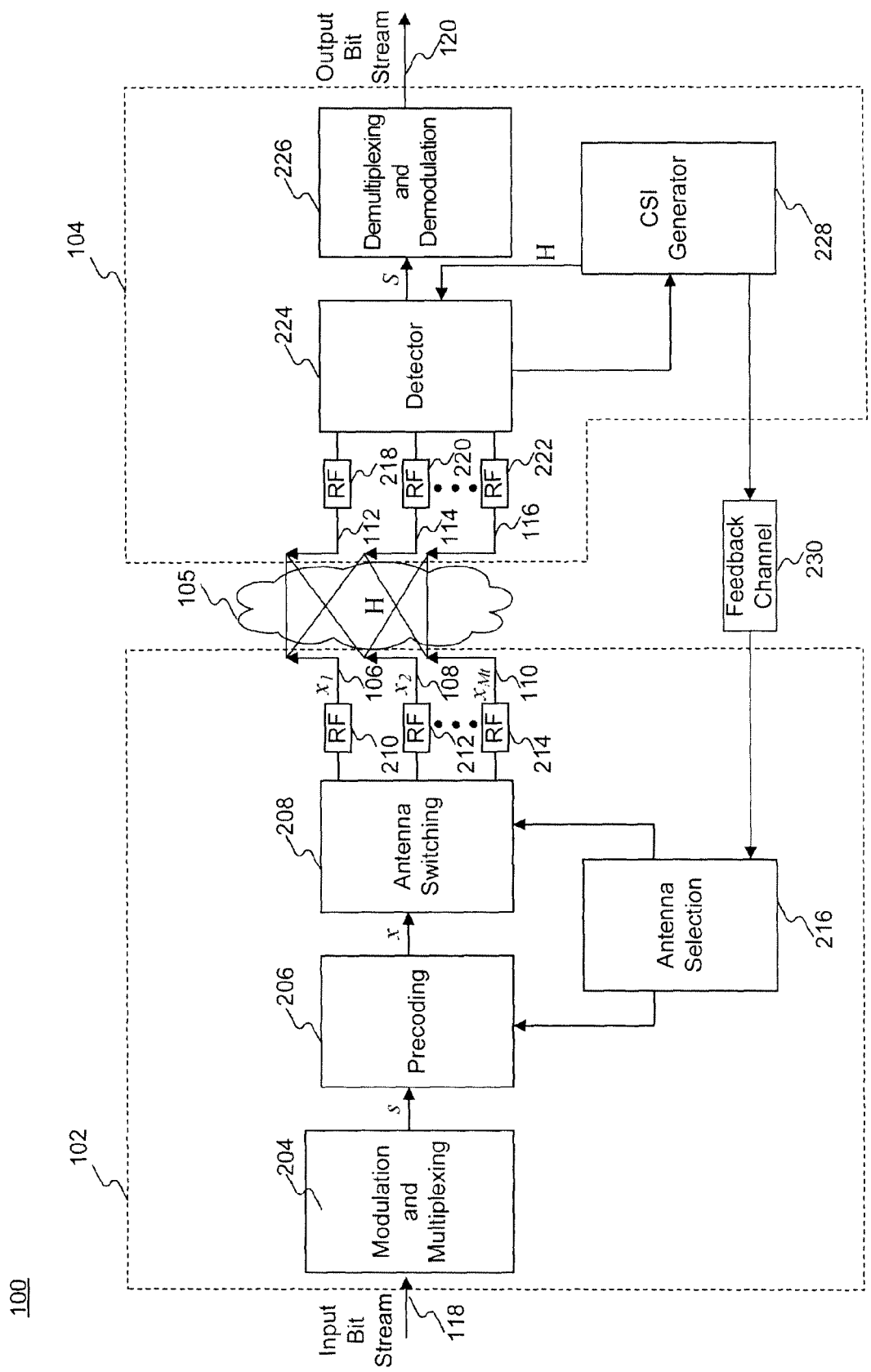
FIG. 2 illustrates a block diagram of a MIMO transceiver in accordance with an embodiment of the present invention.

FIG. 2 further illustrates a high-level functional block diagram of system 100 in accordance with an embodiment of the present invention. As shown in FIG. 2, transmitter 102 can include a modulation and multiplexing (MM) unit 204. MM 204 can be coupled to receive input bit stream 118 and configured to divide bit stream 118 into $M_t$ bit streams. MM unit 204 can further map the $M_t$ bit streams to a set of data symbols $(s_1, s_2, s_3, \ldots, s_{M_t})$ using a modulation constellation such as PSK, 16-QAM, 64-QAM or other such modulation schemes.

Transmitter 102 can further include a precoder unit (PU) 206. PU 206 can be coupled to receive data symbols $(s_1, s_2, s_3, \ldots, s_{M_t})$ and configured to generate transmit symbols $(x_1, x_2, x_3, \ldots, x_{M_t})$. As discussed with respect to FIG. 1, PU 206 can be configured to generate transmit symbols $(x_1, x_2, x_3, \ldots, x_{M_t})$ by encoding data symbols $(s_1, s_2, s_3, \ldots, s_{M_t})$ using various precoding schemes.

PU 206 can encode data symbols $(s_1, s_2, s_3, \ldots, s_{M_t})$ with a precoder F such that:

$$x = Fs \quad (2)$$

where $x = [x_1, x_2, x_3, \ldots, x_{M_t}]^T$ (as discussed above), $s = [s_1, s_2, s_3, \ldots, s_{M_t}]$ is a symbol vector with $M_t$ number of elements, and F is a matrix with dimension $M_t \times M_t$. From equation (2), received signal y (from equation (1)) can be further expressed as:

$$y = HFs + n \quad (3)$$

PU 206 can be coupled to receive CSI of channel 105 from a CSI feedback channel 230. Feedback channel 230 can include a channel that can communicate (to transmitter 102) an estimate of channel 105 generated at receiver 104. PU 206 can utilize CSI received from feedback channel 230 to generate precoder F. As can be seen from equation (3), PU 206 can generate precoder F in a manner that can negate the effects of channel 105. One such precoding scheme that can be implemented by PU 206 is geometric mean decomposition (GMD).

The GMD of channel matrix H can be expressed as:

$$H = QRP_{GMD}^H \quad (4)$$

where matrix H is an estimate of channel 105 (CSI) generated at receiver 104 and communicated to transmitter 102 via feedback channel 230, Q and $P_{GMD}$ can be unitary matrices that can include orthonormal columns. $^H$ denotes a hermetian transpose, and R is a real upper triangular matrix of dimension $M_t \times M_t$ with diagonal elements all equal to the geometric mean of the positive singular values of H. The diagonal elements of matrix R can be expressed as:

$$r_{11} = r_{22} = \ldots = r_{M_t}r_{M_t} = \overline{\sigma} = (\sigma_1 \sigma_2 \ldots \sigma_{M_t})^{\frac{1}{M_t}} \quad (5)$$

where $\sigma_i$ is the i-th nonzero singular value of matrix H.

In one embodiment, PU 206 can encode symbol vector s by choosing precoder $F = P_{GMD}$. From equations (3) and (4), $$y = QRs + n \quad (6)$$

Since Q is a unitary matrix, multiplying both sides of equation (6) by $Q^H$ can result in, $$\begin{bmatrix} \tilde{y}_1 \\ \tilde{y}_2 \\ \vdots \\ \tilde{y}_{M_t} \end{bmatrix} = \begin{bmatrix} r_{11} & r_{12} & \cdots & r_{1M_t} \\ 0 & r_{22} & \cdots & r_{2M_t} \\ \vdots & \vdots & \ddots & \vdots \\ 0 & \cdots & 0 & r_{M_tM_t} \end{bmatrix} \begin{bmatrix} s_1 \\ s_2 \\ \vdots \\ s_{M_t} \end{bmatrix} + \begin{bmatrix} \tilde{n}_1 \\ \tilde{n}_2 \\ \vdots \\ \tilde{n}_{M_t} \end{bmatrix} \quad (7)$$

When a successive interference cancellation (SIC) scheme with perfect interference cancellation is used, equation (7) can be further expressed as:

$$\tilde{y}_i = r_{ii} s_i + \tilde{n}_i \quad (8)$$

As discussed with respect to FIG. 1, transmitter 102 can further include an antenna selection unit (ASU) 216. ASU 216 can be coupled to receive CSI of channel 105, and can be configured to select a best set of $M_t$ number of transmit antennas out of a total of $M_T$ number of antenna elements. As can be seen from equation (8), ASU 216 can select $M_t$ antennas such that diagonal elements of matrix R can be maximized. The antenna selection mechanism that can be implemented by ASU 216 is discussed later in detail.

As shown in FIG. 2, transmitter 102 can further include an antenna switching unit (ASWU) 208. ASWU 208 can be coupled to receive the best set of $M_t$ selected antenna elements (from ASU 216), and can be configured to couple appropriate $M_t$ RF chains (such as exemplary RF units 210, 212 and 214) with corresponding $M_t$ selected antenna elements. Signal x can then be transmitted to receiver 104 via the $M_t$ selected transmit antennas.

Receiver 104 can receive signal y via $M_r$ receive antennas coupled to $M_r$ RF chains (such as exemplary RF units 218, 220 and 222). Receiver 104 can further include a detector unit (DU) 224 that can be coupled to receive signal y and configured to generate an estimated symbol vector $\hat{s}=[\hat{s}_1, \hat{s}_2, \hat{s}_3, \ldots, \hat{s}_{M_t}]$. In an ideal hypothetical transmission, $\hat{s}=s$. Receiver 104 can also include a demultiplexing and demodulation (DD) unit 226 that can be coupled to receive estimated symbol vector $\hat{s}$ and configured to generate output bit stream 120.

As discussed earlier, because CSI of channel 105 at transmitter 102 and receiver 104 can help in improving performance of system 100, receiver 104 can include channel state information generator (CSIG) unit 228. CSIG 228 can be coupled to receive data from transmitter 102 and can be configured to generate an estimate of channel 105 (CSI). For example, CSIG 228 can generate CSI of channel 105 from a pilot signal (that can include common pilot data) that can be transmitted by transmitter 102. Because the pilot data can be known at receiver 104 as a priori information, CSIG 228 can generate an estimate of channel 105 from the received pilot signal by comparing the received pilot data with the known pilot data.

DU 224 can be coupled to receive CSI of channel 105 from CSIG 228. As discussed earlier, CSI of channel 105 generated by CSIG 228 can be communicated to transmitter 102 via feedback channel 230. To further enhance data rate and minimize reception error, DU 224 can be configured to implement a detection scheme that can utilize CSI of channel 105. In one embodiment, DU 224 can be configured to implement a minimum mean square error (MMSE) vertical Bell Laboratories layered space-time (V-BLAST) detector (MMSE-VBLAST).

The MMSE-VBLAST detector that can be implemented by DU 224 can detect symbol vector $\hat{s}$ by applying SIC and an MMSE matrix W. The MMSE matrix of H for SIC process is equivalent to the upper triangularizing matrix of extended channel matrix $H_{ex.}$. So that $$W = [Q_{ex.}{}^u]^H \quad (9)$$

where $Q_{ex.}{}^u$ is a matrix obtained from GMD decomposition of extended channel matrix $H_{ex.}$. The extended channel matrix $H_{ex.}$ can be expressed as:

$$H_{ex.} = \begin{bmatrix} H \\ \sqrt{\alpha} I_{M_t} \end{bmatrix} = \begin{bmatrix} Q_{ex.}^u \\ Q_{ex.}^l \end{bmatrix} R_{ex.} = Q_{H_{ex.}} R_{ex.} \quad (10)$$

where $Q_{ex.}{}^u$ is a unitary matrix and $R_{ex.} \in C^{M_t \times M_t}$ is an upper triangular matrix with positive real number diagonal elements. DD 226 can be coupled to receive estimated symbol vector $\hat{s}$ and can generate output bit stream 120.

In some embodiments, $H_{ex.}$ can be communicated to PU 206 via feedback channel 230 as CSI of channel 105. In a manner similar to that discussed in equations (4) and (5), PU 206 can apply GMD on $H_{ex.}$ to derive precoder F. The GMD of $H_{ex.}$ can be expressed as:

$$H_{ex.} = \begin{bmatrix} I_{M_r} & 0 \\ 0 & \Omega_0 \end{bmatrix} \tilde{Q} \tilde{R} \tilde{P}_{GMD}^H \Omega_0^H \quad (11)$$

where $\Omega_0 \in C^{M_t \times M_t}$ and $\tilde{P}_{GMD}{}^H \in C^{M_t \times M_t}$ are unitary matrices, $\tilde{Q} \in C^{(M_r+M_t) \times M_t}$ is a semi-unitary matrix, $\tilde{R} \in C^{M_t \times M_t}$ is an upper triangular matrix and $I_{M_r}$ is an identity matrix. PU 206 can select precoder $F = \Omega_0 = \tilde{P}_{GMD}{}^H$. Because CSI of channel 105 $H = H_{ex.}$, and pre-multiplying $$Q_{H_\infty}^H = \tilde{Q}^H \begin{bmatrix} I_{M_r} & 0 \\ 0 & \Omega_0 \end{bmatrix}^H$$

on both sides of equation (3), a received signal can be expressed in a manner similar to that discussed in equation (8) where $r_{ii} = \tilde{r}_{ii}$. The diagonal elements ($\tilde{r}_{ii}$) of upper triangular matrix $\tilde{R} \in Chu \, M^{t \times M_t}$ can be expressed as:

$$\tilde{r} = \tilde{r}_{ii} = \left( \prod_{l=1}^{M_t} \sqrt{\sigma_l^2 + \alpha} \right)^{\frac{1}{m_t}}, i = 1, 2, \ldots, M_t \quad (12)$$

the diagonal elements of $\tilde{R}$ can be further expressed as:

$$\tilde{r}_{ii}^2 = \alpha(1 + \tilde{\rho}_i) \quad (13)$$

and $$\tilde{r}^{2M_t} = \left( \prod_{l=1}^{M_t} \tilde{r}_{ii} \right)^2 = \left( \prod_{l=1}^{M_t} \sigma_{\tilde{R},i} \right)^2 = \left( \prod_{l=1}^{M_t} \sigma_{H_{ex.},i} \right)^2 \quad (14)$$
$$= \det(H_{ex.}^H H_{ex.}).$$

where $\tilde{\rho}_i$ is the signal-to-interference-and-noise ratio (SINR). As can be seen from equations (13) and (14), BER performance can be improved by maximizing $\tilde{r}_{ii}$.

As discussed earlier, in order to improve the BER performance of system 100, ASU 216 can be configured to select a best set of $M_t$ number of transmit antennas out of a total of $M_T$ number of antenna elements. As can be seen from equations (12), (13) and (14), because the value of $\tilde{r}$ can depend on $H_{ex.}$, ASU 216 can select the best set of $M_t$ antennas by selecting a matrix $H_{sel}$ that can maximize the diagonal elements of $\tilde{R}$ (i.e. by maximizing $\tilde{r}_{ii}$).

In some embodiments, an selection criteria that can be implemented by ASU 216 can be expressed as:

$$H_{sel.} = \underset{\tilde{H}_{ex.}}{\operatorname{argmax}}\left(\det\left(\tilde{H}_{ex.}^H \tilde{H}_{ex.}\right)\right) \tag{15}$$

where $$\tilde{H}_{ex.} = \begin{bmatrix} H_{pruned} \\ \sqrt{\alpha}\, I_{M_t} \end{bmatrix},$$

and $H_{pruned} \in C^{M_r \times M_t}$ is a subset matrix of a complete channel matrix $H_{AS} \in C^{M_R \times M_T}$ with $M_R$ and $M_T$ number of receiver and transmitter antenna elements, respectively.

As can be seen from equation (15), ASU 216 can select the best set of $M_t$ transmit antennas by computing determinants for all possible transmit antenna elements ($M_T$) to select a $H_{pruned}$ that can maximize the diagonal elements of $\tilde{R}$. Therefore, ASU 216 can evaluate $$\binom{M_T}{M_t}$$

transmit antenna elements where $$\binom{N}{K} = \frac{N!}{(N-K)!K!}.$$

Performing a full exhaustive determinant search by evaluating all $$\binom{M_T}{M_t}$$

transmit antenna elements to select the best set of $M_t$ antennas can be computationally expensive. In order to reduce computational complexity, in one embodiment, ASU 216 can implement a Gram-Schmidt orthogonalization (GSO) based search to select the best set of $M_t$ antennas.

Figure 3:
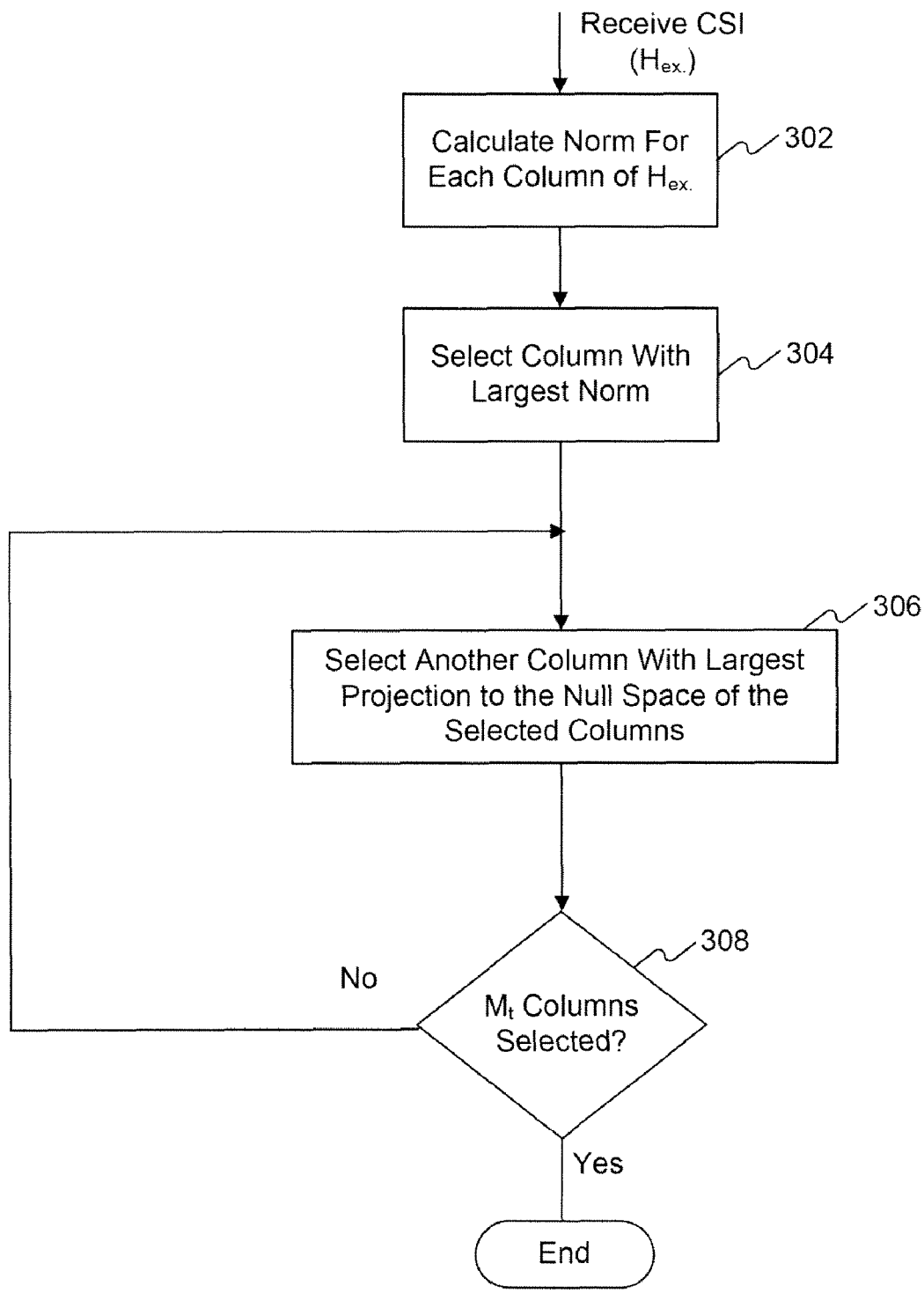
FIG. 3 is a flow diagram of an antenna selection method in accordance with an embodiment of the present invention.

FIG. 3 illustrates a flow diagram of the GSO based search that can be performed by ASU 216 in accordance with an embodiment of the present invention. As illustrated in FIG. 3, ASU 216 can receive CSI of channel 105 (for example $H_{ex.}$). In step 302, ASU 216 can compute the norm for each column in $H_{ex.}$. In step 304, ASU 216 can select a column with the largest norm. In step 306, ASU 216 can select another column that has the largest projection distance to a null space that can be included by all the previously selected columns. In step 308, if $M_t$ columns have not been selected (308—No), then in step 306, ASU 216 can select another column that has the largest projection distance to the null space that can be included by all the previously selected columns. If in step 308, $M_t$ columns have been selected (308—Yes), the search process can end. AWSU 208 (not shown in FIG. 3) can then transmit data to receiver 104 by coupling appropriate RF units (such as exemplary RF units 210, 212 and 214) with the corresponding $M_t$ antenna elements associated with the $M_t$ columns of $H_{pruned}$.

Figure 4:
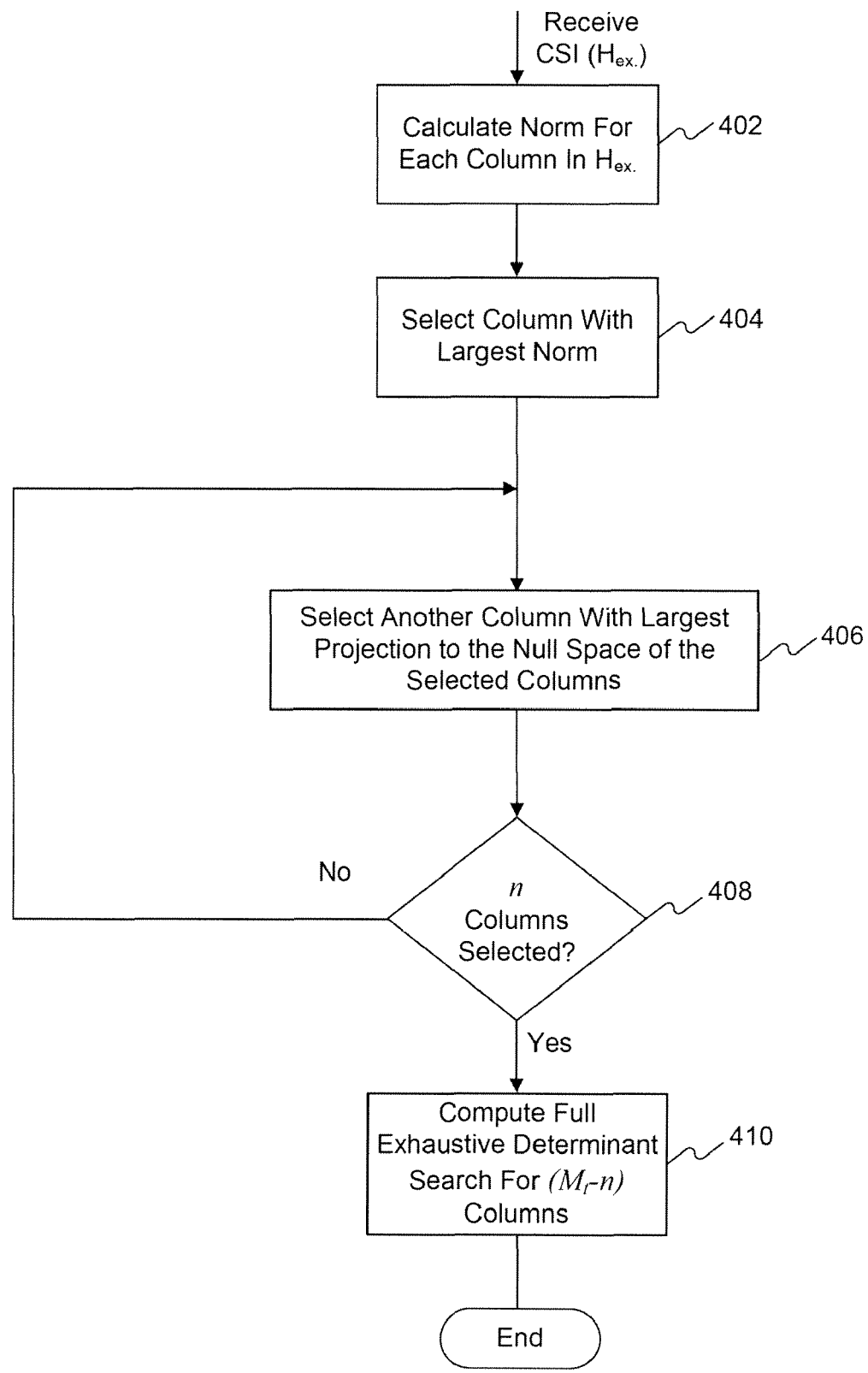
FIG. 4 is a flow diagram of another antenna selection method in accordance with an embodiment of the present invention.

In one embodiment, in order to further boost BER performance of system 100 in fading environments, ASU 216 can implement a (n, $M_t$–n) modified GSO (m-GSO) method to select the best set of M, transmit antennas (where n<$M_t$). FIG. 4 illustrates a flow diagram of the m-GSO based search that can be performed by ASU 216 consistent with some embodiments of the present invention.

As illustrated in FIG. 4, ASU 216 can receive CSI of channel 105. In one embodiment, ASU 216 can receive CSI of channel 105 as extended matrix $\overline{H}_{ex.}$ where $$\overline{H}_{ex.} = \begin{bmatrix} H_{T\text{-}AS} \\ \sqrt{\alpha}\, I_{M_T} \end{bmatrix}_{(M_r + M_T) \times M_T} \tag{16}$$

where $H_{T\text{-}AS} \in C^{M_r \times M_T}$ is a complete channel matrix with $M_r$ and $M_T$ number of receiver and transmitter antenna elements, respectively.

In step 402, ASU 216 can compute the norm for each column in $\overline{H}_{ex.}$. In step 404, ASU 216 can select a column with the largest norm. In step 406, ASU 216 can select another column that has the largest projection distance to the null space that can be included by all the previously selected columns. In step 408, if n columns have not been selected (408—No), then in step 406, ASU 216 can select another column that has the largest projection distance to the null space that can be included by all the previously selected columns. If in step 408, n columns have been selected (408—Yes), then in step 410, ASU 216 can select the remaining ($M_t$–n) columns of $H_{T\text{-}AS}$ by performing a full exhaustive determinant search by computing $$\binom{M_T - n}{M_t - n}$$

possible determinants under n known columns in a manner similar to that described in equation (15). AWSU 208 (not shown in FIG. 3) can then transmit data to receiver 104 by coupling appropriate RF units (such as exemplary RF units 210, 212 and 214) with the corresponding $M_t$ antenna elements associated with the $M_t$ columns of $H_{T\text{-}AS}$.

A complexity analysis in terms of number of arithmetic operations (flops) for the m-GSO based search illustrated in FIG. 4, can be expressed as follows: Number of real multiplications (RM) in Step 404 can be expressed as:

$$2M_T(M_r+1) \tag{17}$$

Number of real additions (RA) in Step 404 can be expressed as:

$$2M_T(M_r+1) \tag{18}$$

Number of operations Step 406 can be expressed as:

$$\sum_{k=1}^{n-1}(M_T - k)\{[(2kM)_{CM} + (2(k+1)M)_{RM} + (2k)_{RD} + ((k+1)M - k)_{CA} + (2(k+1)M - k - 1)_{RA}]\} \tag{19}$$

where (CM) denotes complex multiplication, (CA) denotes complex addition, (RD) denotes real division, and $M=M_T+M_r$; and Number of operations in Step 414 can be expressed as:

$$\binom{M_t-n}{M_t-n}\{[(M_t^2 M_r)_{CM} + (M_t^2(M_r-1))_{CA} + (M_t)_{RM} + (M_t)_{RA}] + \quad (20)$$

(number of CMs for a $M_t \times M_t$ determinant) +

(number of CAs for a $M_t \times M_t$ determinant)}.

TABLE 1

Complexity comparison of full exhaustive determinant search and m-GSO search

| | 4 × 6 | | 4 × 7 | |
|---|---|---|---|---|
| | Exaust. det. | Modified GSO-based | Exaust. det. | Modified GSO-based |
| CM | 1560 | 724 | 3320 | 1172 |
| RM | 60 | 284 | 140 | 274 |
| RD | 0 | 10 | 0 | 12 |
| CA | 1065 | 521 | 2485 | 836 |
| RA | 60 | 274 | 140 | 362 |
| Flops count | 2745 | 1813 | 6085 | 2756 |

Table 1 depicts a comparison in terms of arithmetic complexity (flops), between an antenna selection scheme employing a full exhaustive determinant search and a (2, 2) modified-GSO search. Table 1 was computed from equations (17)-(20) for a 4×4 spatial multiplexing system with $M_t=4$ & $M_T=6$ (4×6) and $M_t=4$ & $M_T=7$ (4×7). As depicted in table 1, the modified-GSO search can be less computationally complex to implement.

FIGS. 5a, 5b, 5c and 5d are graphs illustrating plots of signal-to-noise (SNR) (depicted on the x-axis in dB) vs. bit error rate (BER) performance of system 100. The data for these plots were obtained by simulating operation of system 100 implementing the various antenna selection schemes consistent with the present invention. The simulation of system 100 was performed using a 4×4 spatial multiplexing MIMO baseband transceiver, 16-QAM modulation, $M_t=4$, $M_T=5, 6, 7$, and n=2 for the (2,2) m-GSO scheme.

Figure 5A:
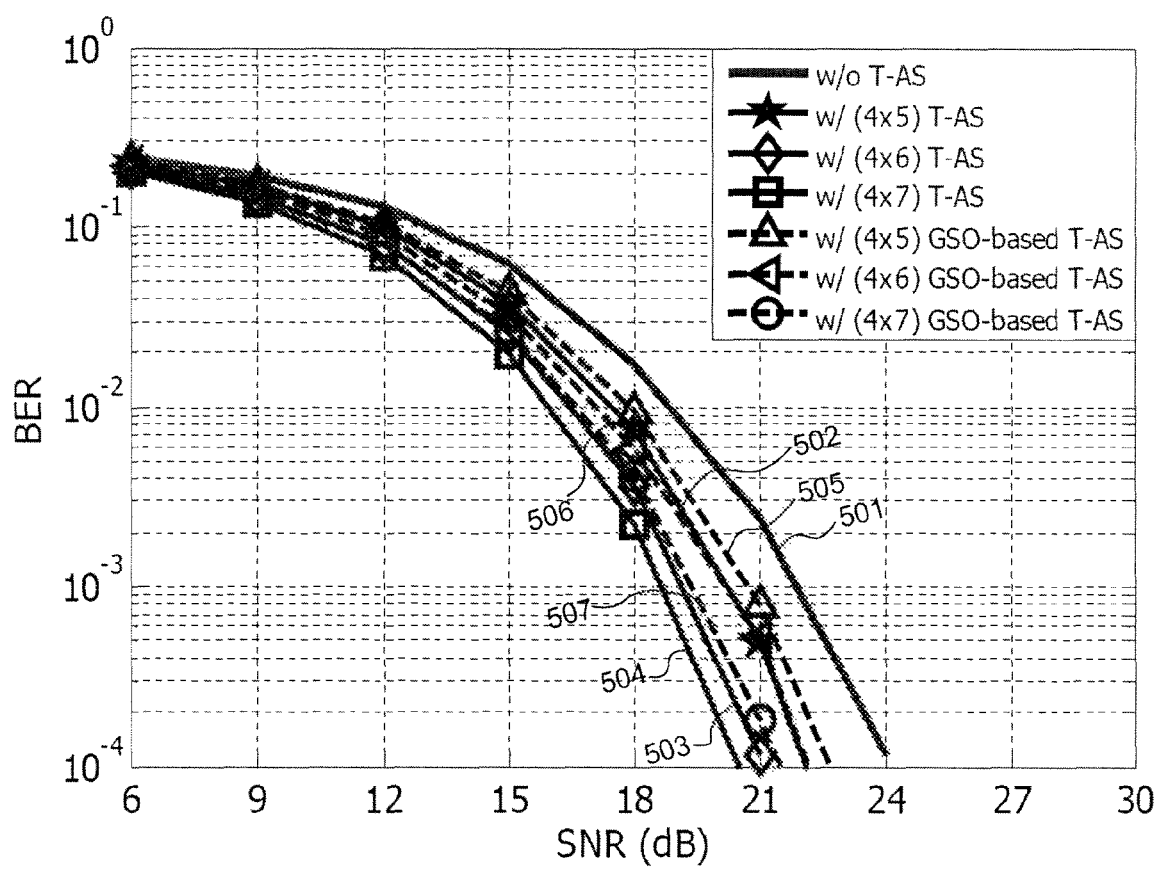
FIGS. 5$a$-5$d$ are graphs illustrating performance of a MIMO transceiver in accordance with an embodiment of the present invention.

FIG. 5a illustrates the performance of system 100 under an i.i.d fading channel. Plot 501, illustrates the performance of system 100 when no transmit antenna selection (T-AS) scheme is implemented. Plots 502, 503, and 504 illustrate the performance of system 100 when a full exhaustive determinant T-AS search for $M_t=4$ & $M_T=5$ (4×5), $M_t=4$ & $M_T=6$ (4×6), and $M_t=4$ & $M_T=7$ (4×7) are implemented, respectively. Plots 505, 506, and 507 illustrate the performance of system 100 when the GSO-based T-AS search for $M_t=4$ & $M_T=5$ (4×5), $M_t=4$ & $M_T=6$ (4×6), and $M_t=4$ & $M_T=7$ (4×7) are implemented, respectively.

Figure 5B:
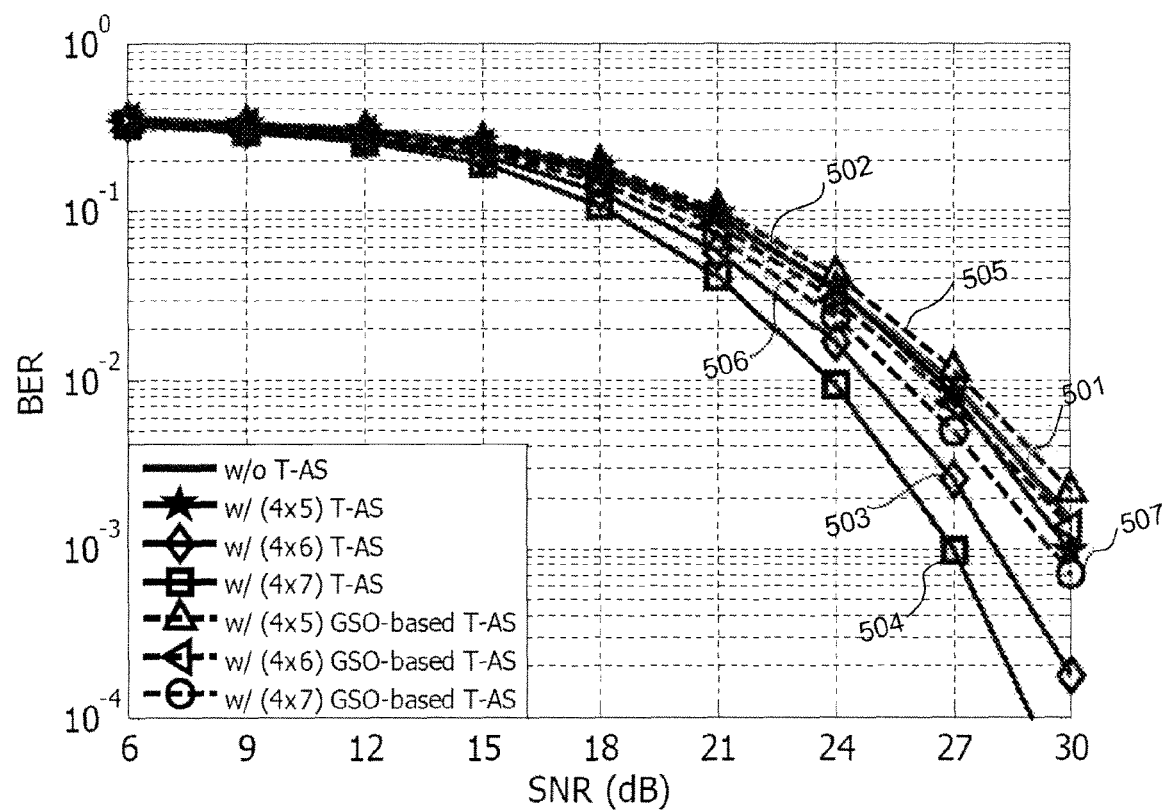

FIG. 5b illustrates the performance of system 100 in the spatial channel model (SCM) as developed by 3GPP-3GPP2. Plot 501, illustrates the performance of system 100 when no transmit antenna selection (T-AS) scheme implemented. Plots 502, 503, and 504 illustrate the performance of system 100 when a full exhaustive determinant T-AS search for $M_t=4$ & $M_T=5$ (4×5), $M_t=4$ & $M_T=6$ (4×6), and $M_t=4$ & $M_T=7$ (4×7) are implemented, respectively. Plots 505, 506, and 507 illustrate the performance of system 100 when the GSO-based T-AS search for $M_t=4$ & $M_T=5$ (4×5), $M_t=4$ & $M_T=6$ (4×6), and $M_t=4$ & $M_T=7$ (4×7) are implemented, respectively.

Figure 5C:
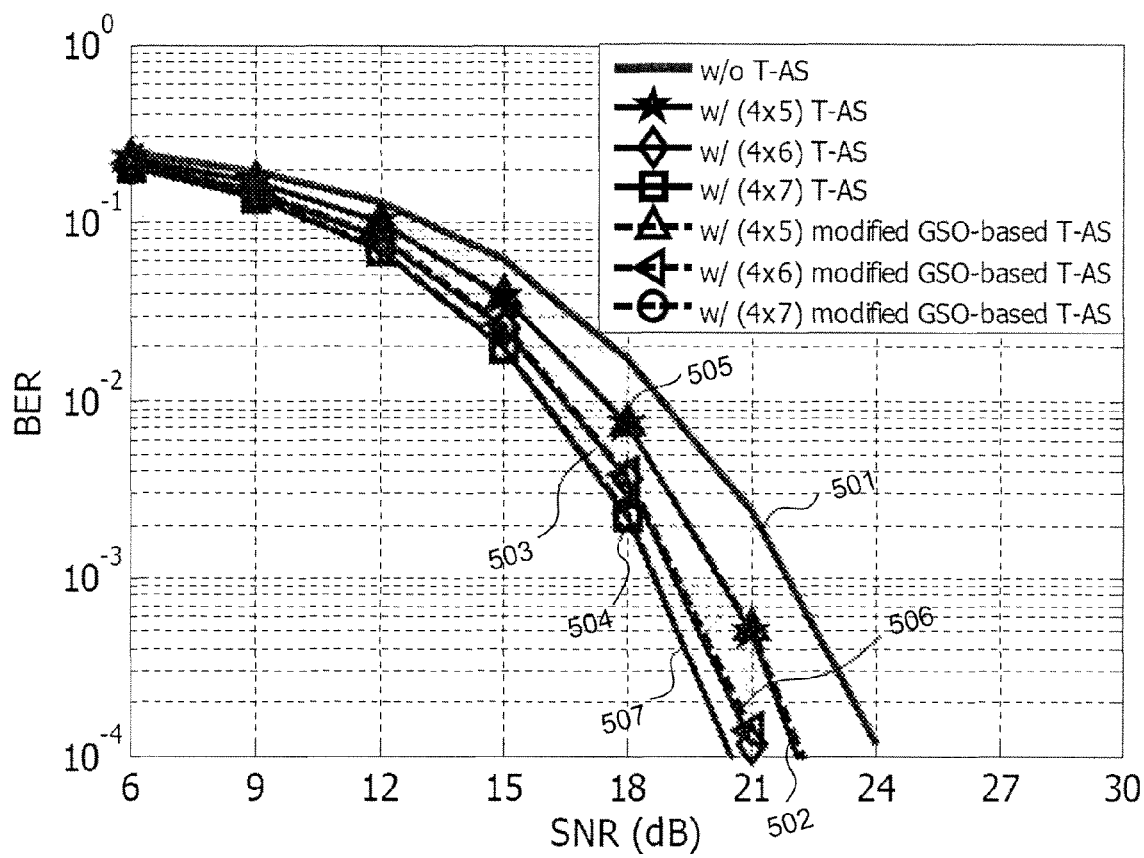

FIG. 5c illustrates the performance of system 100 under an i.i.d fading channel. Plot 501, illustrates the performance of system 100 when no T-AS scheme implemented. Plots 502, 503, and 504 illustrate the performance of system 100 when a full exhaustive determinant T-AS search for $M_t=4$ & $M_T=5$ (4×5), $M_t=4$ & $M_T=6$ (4×6), and $M_t=4$ & $M_T=7$ (4×7) are implemented, respectively. Plots 505, 506, and 507 illustrate the performance of system 100 when the (2,2) modified GSO-based T-AS search for $M_t=4$ & $M_T=5$ (4×5), $M_t=4$ & $M_T=6$ (4×6), and $M_t=4$ & $M_T=7$ (4×7) are implemented, respectively.

Figure 5D:
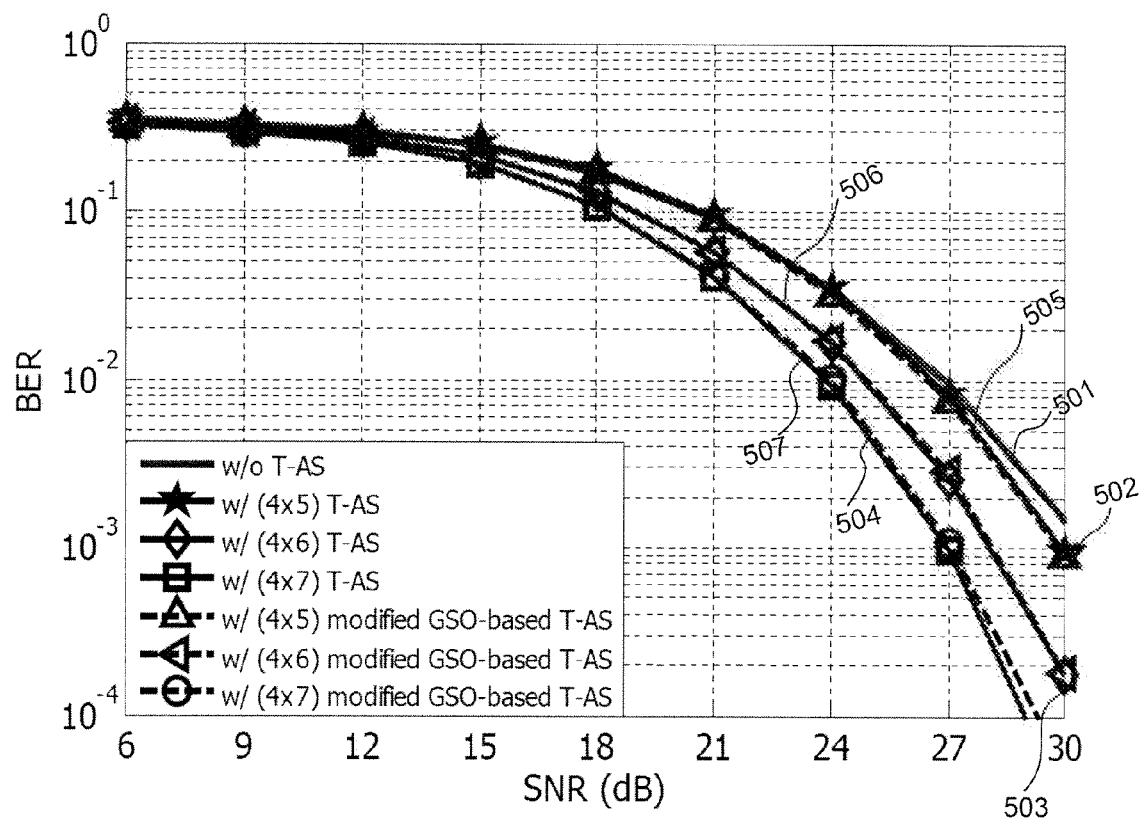

FIG. 5d illustrates the performance of system 100 in the spatial channel model (SCM) as developed by the $3^{rd}$ Generation Partnership Project (3GPP-3GPP2). Plot 501, illustrates the performance of system 100 when no T-AS scheme is implemented. Plots 502, 503, and 504 illustrate the performance of system 100 when a full exhaustive determinant T-AS search for $M_t=4$ & $M_T=5$ (4×5), $M_t=4$ & $M_T=6$ (4×6), and $M_t=4$ & $M_T=7$ (4×7) are implemented, respectively. Plots 505, 506, and 507 illustrate the performance of system 100 when the (2,2) modified-GSO-based T-AS search for $M_t=4$ & $M_T=5$ (4×5), $M_t=4$ & $M_T=6$ (4×6), and $M_t=4$ & $M_T=7$ (4×7) are implemented, respectively.

Based on a comparison of the plots in FIGS. 5a and 5c (i.i.d fading channel environment) and the corresponding plots in FIGS. 5b and 5d (SCM environment), the implementation of the modified-GSO based search (plots 505, 506, and 507) improved the performance of system 100 in comparison with the GSO-based search (plots 502, 503, 504) by reducing the BER for a given SNR level. Additionally, the implementation of the modified-GSO based search (plots 505, 506, and 507) was consistent with the performance of system 100 in comparison with the full exhaustive determinant search (plots 502, 503, 504).

Other embodiments will be apparent to those skilled in the art from consideration of the specification and practice disclosed herein. It is intended that the specification and examples be considered as exemplary only, with a true scope and spirit of the invention being indicated by the following claims.

What is claimed is:

1. A method for transmitting data in a communication system, comprising:
   encoding at least one data symbol by implementing a first precoding scheme, the first precoding scheme including a precoder derived from a first channel state information (CSI);
   selecting at least one antenna that maximizes the first CSI, the at least one antenna being selected by implementing a first selection scheme, wherein the first selection scheme includes:
   calculating a norm for each column in the first CSI;
   selecting a first column with a largest norm;
   calculating a projection distance for each column in the first CSI with respect to a null space of all previously selected columns;
   selecting a second column with a largest projection distance; and
   selecting the at least one antenna corresponding to the second column; and
   transmitting the at least one data symbol via the at least one antenna.

2. The method of claim 1 wherein encoding the at least one data symbol by implementing the first precoding scheme further includes providing the first coding scheme as a geometric mean decomposition (GMD).

3. The method of claim 1 wherein encoding the at least one data symbol by implementing the first precoding scheme further includes providing the first CSI as an estimate of a channel.

4. The method of claim 1 wherein selecting at least one antenna that maximizes the first CSI includes providing the first selection scheme as a Gram-Schmidt orthogonolization (GSO) scheme.

5. The method of claim 1 wherein selecting the at least one antenna that maximizes the first CSI includes providing the first selection scheme as a modified GSO (m-GSO) scheme.

6. The method of claim 5 wherein selecting the at least one antenna by using the m-GSO scheme further comprises:
   selecting a first at least one antenna by implementing the GSO based scheme; and
   selecting a second at least one antenna by implementing a full exhaustive determinant search.

7. A transmitter in a MIMO communication system, comprising:
   a precoder unit (PU) coupled to receive at least one data symbol, and utilizing a first channel state information (CSI) to encode the at least one data symbol by implementing a first precoding scheme; and
   an antenna selection unit (ASU) coupled to receive the first CSI, the ASU further configured to select at least one antenna that maximizes the first CSI, the at least one antenna being selected by implementing a first selection scheme, wherein the first selection scheme includes:
   calculating a norm for each column in the first CSI;
   selecting a first column with a largest norm;
   calculating a prosection distance for each column in the first CSI with respect to a null space of all previously selected columns;
   selecting a second column with a largest projection distance; and
   selecting the at least one antenna corresponding to the second column.

8. The transmitter of claim 7 including the PU encoding at least one data symbol by implementing a first precoding scheme, wherein the PU unit is configured to encode the at least one data symbol by implementing the first precoding scheme as a geometric mean decomposition (GMD).

9. The transmitter of claim 7 including the ASU selecting the at least one antenna that maximizes the first CSI by implementing the first selection scheme as a Gram-Schmidt orthogonolization (GSO) scheme.

10. The transmitter of claim 7 including the ASU selecting the at least one antenna that maximizes the first CSI by implementing the first selection scheme as a modified GSO (m-GSO) scheme.

11. The transmitter of claim 10 including the ASU selecting the at least one antenna by implementing the m-GSO scheme, further comprises:
    the ASU selecting a first at least one antenna by implementing the GSO scheme, and selecting a second at least one antenna by implementing a full exhaustive search.

* * * * *

UNITED STATES PATENT AND TRADEMARK OFFICE
CERTIFICATE OF CORRECTION

PATENT NO. : 8,149,946 B2
APPLICATION NO. : 12/354385
DATED : April 3, 2012
INVENTOR(S) : Hsi-Pin Ma et al.

It is certified that error appears in the above-identified patent and that said Letters Patent is hereby corrected as shown below:

On the Title Page, Item (75), in the Inventors, line 1, "Hsin-Pin Ma," should read --Hsi-Pin Ma,--.

On the Title Page, Item (57), in the Abstract, line 4, "first preceding scheme" should read --first precoding scheme--.

In claim 7, column 12, line 1, "prosection distance" should read --projection distance--.

Signed and Sealed this
Sixth Day of November, 2012

David J. Kappos
*Director of the United States Patent and Trademark Office*